United States Patent
Hollis et al.

(10) Patent No.: US 8,573,056 B1
(45) Date of Patent: Nov. 5, 2013

(54) GUIDED PROJECTILE WITH MOTION RESTRICTING PIEZOELECTRIC ACTUATOR

(75) Inventors: Michael Hollis, Flanders, NJ (US);
Jyeching Lee, Raritan, NJ (US);
Jennifer Cordes, Rockaway, NJ (US);
Shana Groeschler, Passaic, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 678 days.

(21) Appl. No.: 12/794,134

(22) Filed: Jun. 4, 2010

(51) Int. Cl.
*G01C 19/00* (2013.01)

(52) U.S. Cl.
USPC .................................................. 73/504.15

(58) Field of Classification Search
USPC ............................................................ 73/493
See application file for complete search history.

(56) References Cited

U.S. PATENT DOCUMENTS

| | | | | |
|---|---|---|---|---|
| 3,304,773 A | * | 2/1967 | Rogallo | 73/862.68 |
| 4,703,215 A | * | 10/1987 | Asano | 310/328 |
| 4,783,610 A | * | 11/1988 | Asano | 310/328 |
| 4,845,357 A | * | 7/1989 | Brennan | 250/227.14 |
| 4,937,489 A | * | 6/1990 | Hattori et al. | 310/328 |
| 5,927,699 A | * | 7/1999 | Nakajima et al. | 267/140.14 |
| 6,545,384 B1 | * | 4/2003 | Pelrine et al. | 310/309 |
| 6,578,682 B2 | * | 6/2003 | Braman et al. | 188/378 |
| 6,737,788 B2 | * | 5/2004 | Moler et al. | 310/328 |
| 6,752,020 B1 | * | 6/2004 | Sobotta et al. | 73/702 |
| 6,975,061 B2 | * | 12/2005 | Moler | 310/328 |
| 7,567,232 B2 | * | 7/2009 | Rosenberg | 345/156 |
| 8,193,754 B2 | * | 6/2012 | Rastegar et al. | 318/686 |
| 8,205,445 B2 | * | 6/2012 | Browne et al. | 60/528 |
| 8,266,960 B2 | * | 9/2012 | Braman et al. | 73/493 |
| 2006/0125291 A1 | * | 6/2006 | Buravalla et al. | 296/204 |
| 2007/0113702 A1 | * | 5/2007 | Braman et al. | 74/574.4 |
| 2010/0288181 A1 | * | 11/2010 | Ersoy et al. | 116/98 |

FOREIGN PATENT DOCUMENTS

WO    WO 2010002373 A1 *  1/2010

* cited by examiner

*Primary Examiner* — Hezron E Williams
*Assistant Examiner* — Mark A Shabman
(74) *Attorney, Agent, or Firm* — Michael C. Sachs

(57) ABSTRACT

An inertial measurement unit may include a housing having an internal volume. The internal volume may have a dimension along an axis. A sensing element may be disposed in the internal volume. The sensing element may have a dimension along the axis that is less than the dimension of the internal volume. At least one piezoelectric actuator may be disposed in the housing adjacent the sensing element. When the at least one piezoelectric actuator is activated, it may prevent movement of the sensing element along the axis. When it is not activated, it may not prevent movement of the sensing element along the axis.

19 Claims, 7 Drawing Sheets

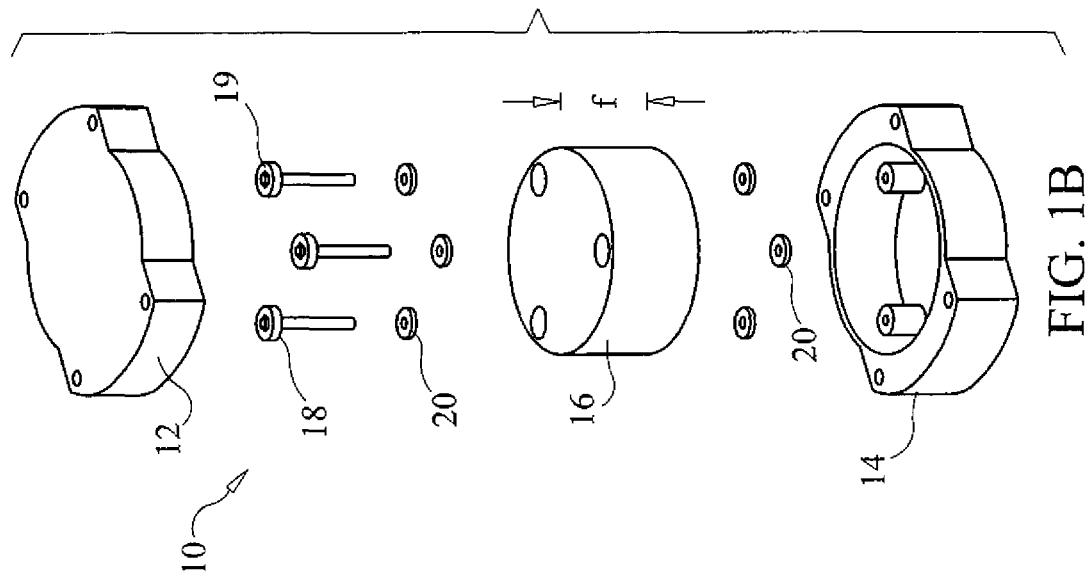
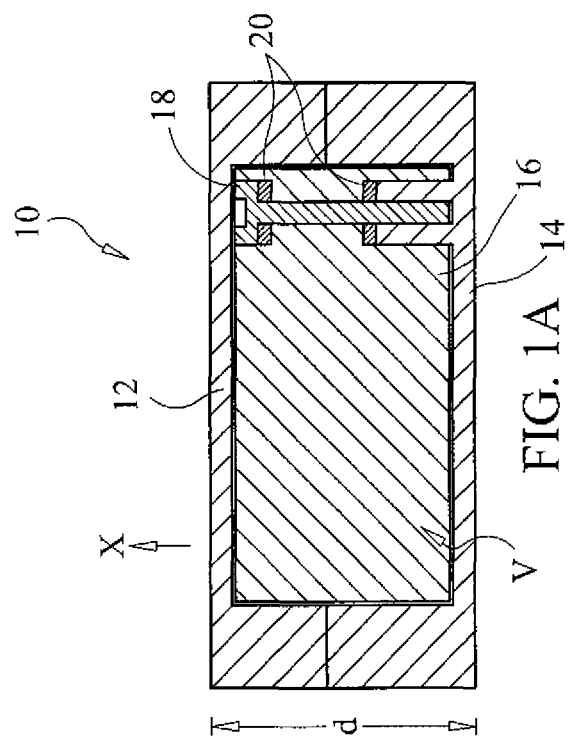
FIG. 1A
FIG. 1B

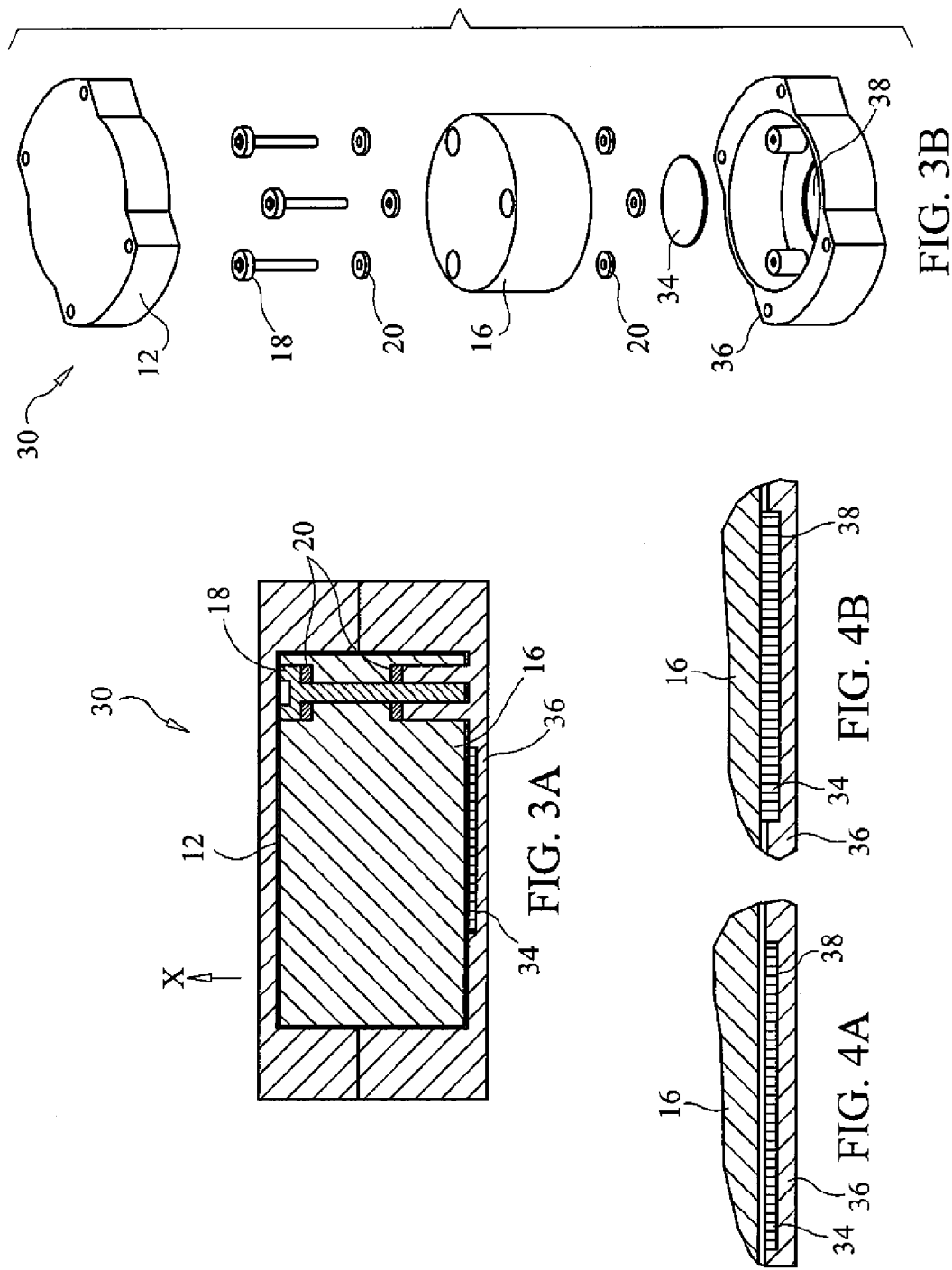

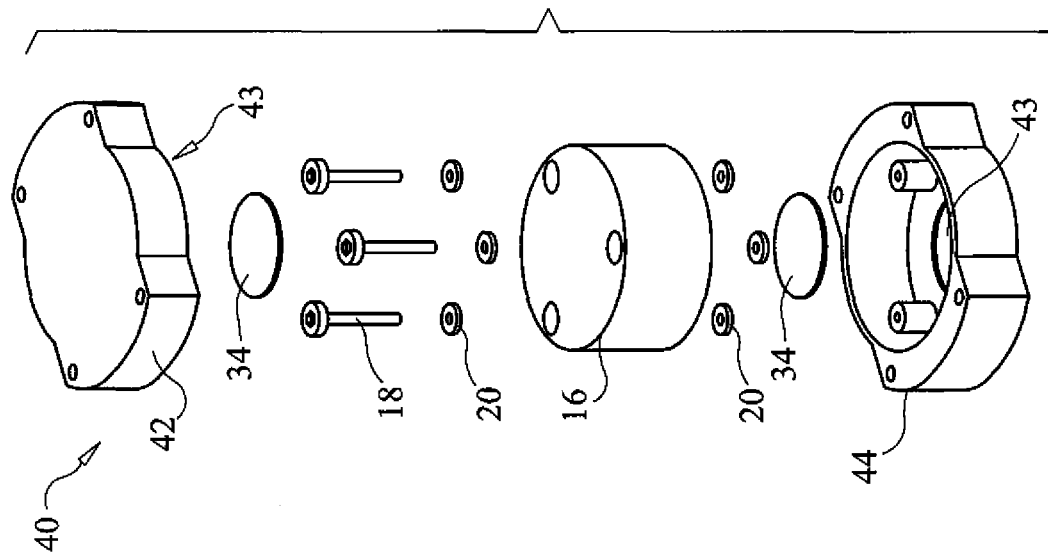
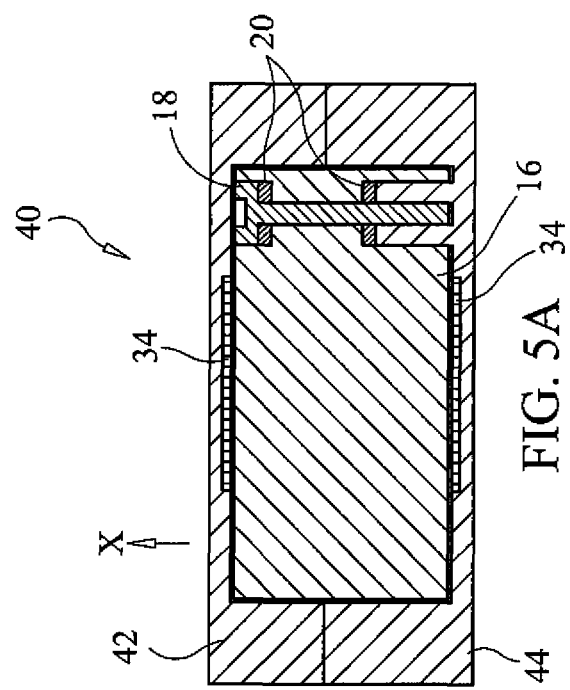
FIG. 5B
FIG. 5A

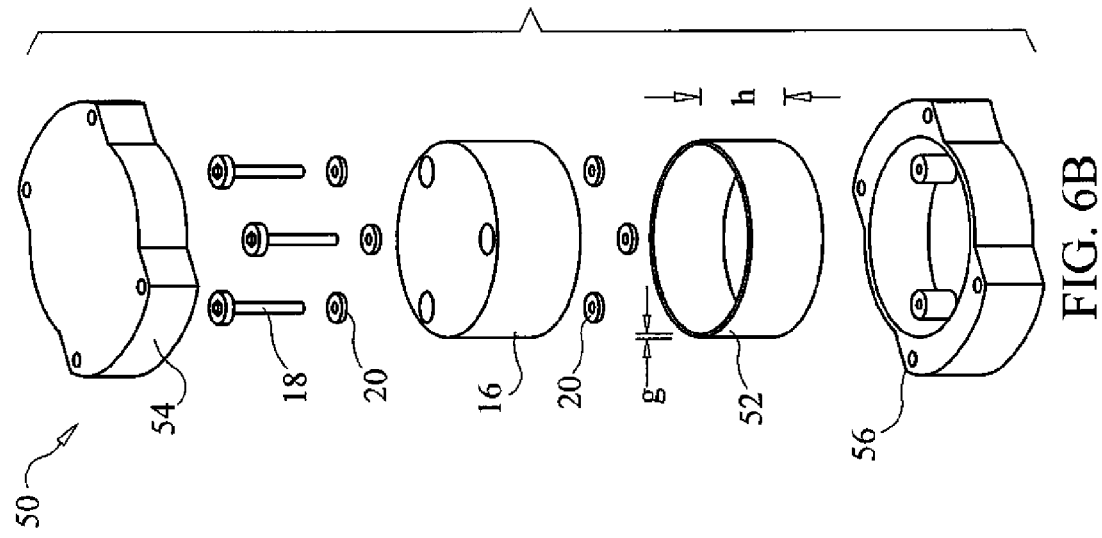
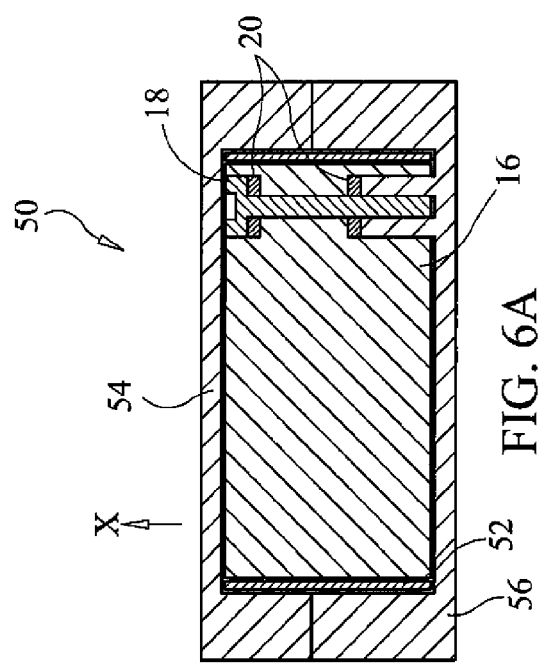
FIG. 6B
FIG. 6A

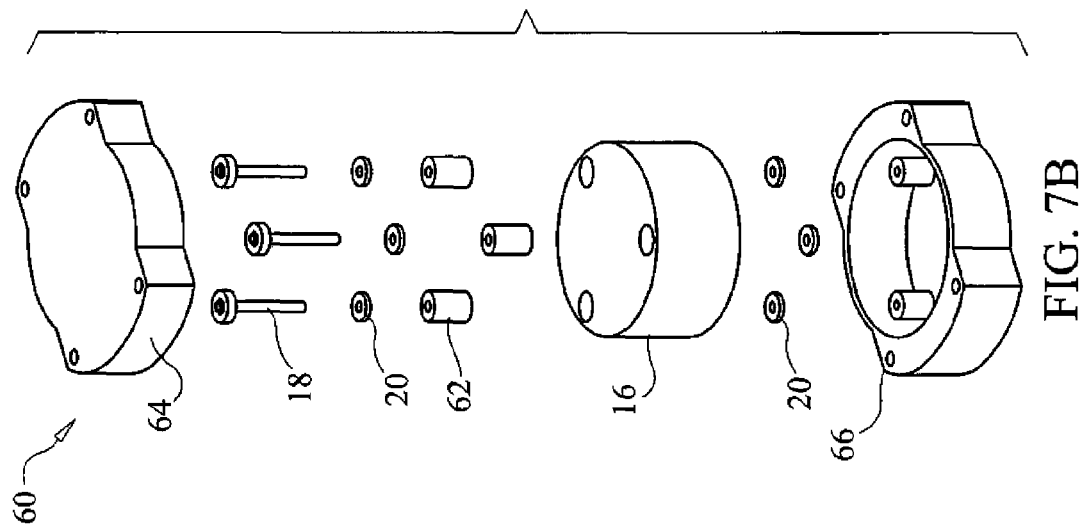
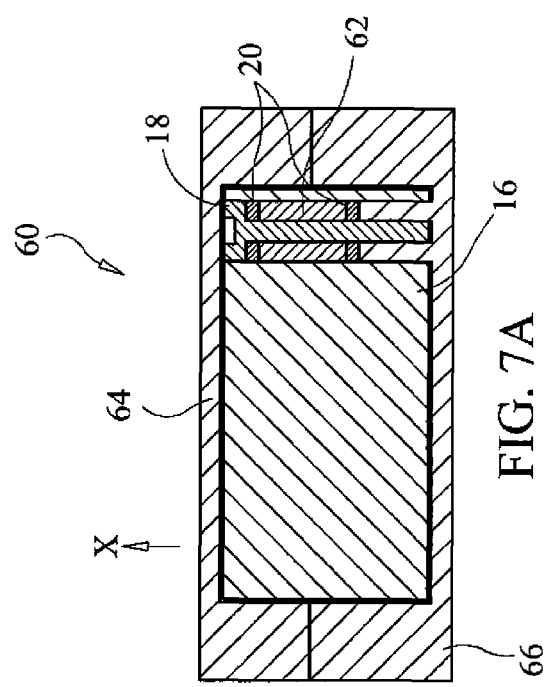
FIG. 7A
FIG. 7B

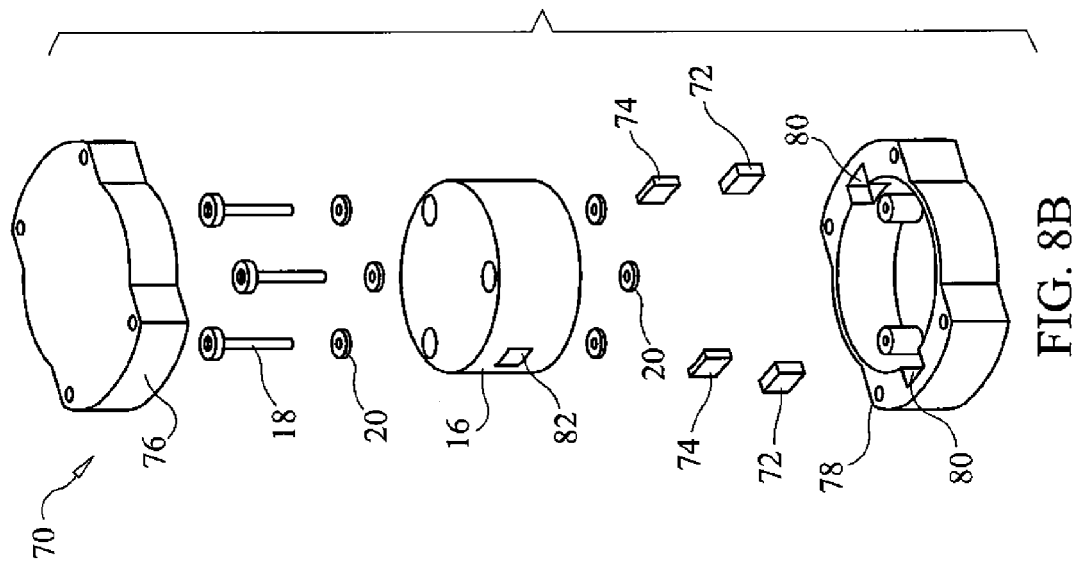
FIG. 8B
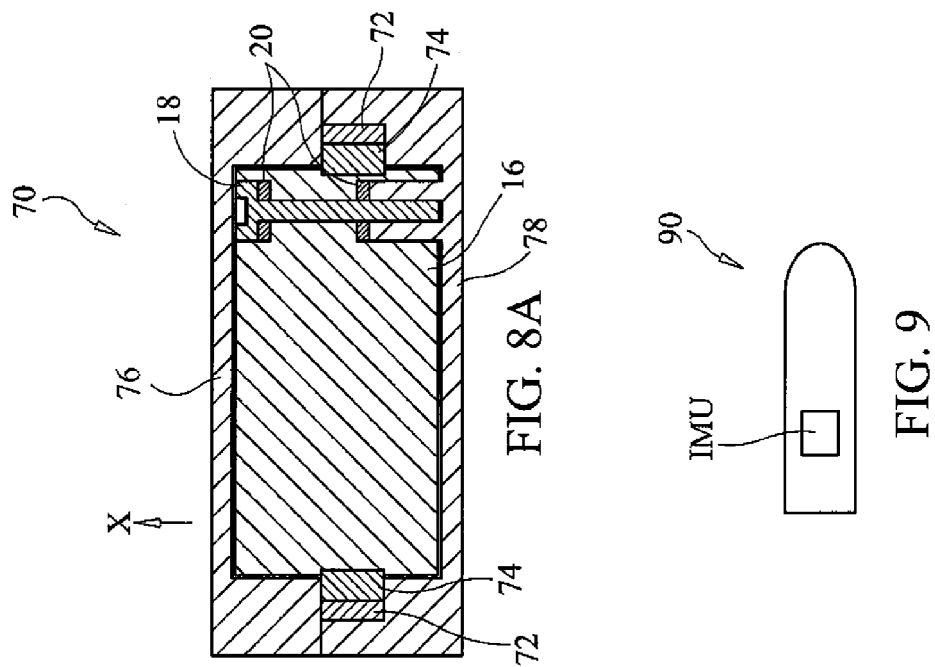
FIG. 8A
FIG. 9

GUIDED PROJECTILE WITH MOTION RESTRICTING PIEZOELECTRIC ACTUATOR

CONTINUING APPLICATION

This application is a continuation-in-part of application Ser. No. 12/487,145 filed Jun. 18, 2009 by the same Applicants hereof, and commonly assigned, entitled "Means For Improving Inertial Measurement Unit Reliability For Cannon Launched Applications", issued on Feb. 14, 2012 as U.S. Pat. No. 8,113,045.

BACKGROUND OF THE INVENTION

The invention relates, in general, to guided projectiles, and, in particular, to guided projectiles containing sensing elements that are subject to high launching forces.

Guided projectiles may include an inertial measurement unit (IMU). The IMU may include various sensing elements, for example, accelerometers. The IMU is a critical part of the flight control system for an airframe or projectile. Guided projectiles may be launched using artillery, tank cannon, or other types of guns. The projectile undergoes high forces at launch. The launching environment may apply extreme, high-frequency forces in all orthogonal directions to the sensing element of the IMU. These high forces may damage or destroy the ability of the IMU to function properly. A need exists for apparatus and methods to improve the survivability of an IMU during launch.

SUMMARY OF THE INVENTION

It is an object of the invention to provide a method and apparatus to improve the survivability of an IMU during a launching event.

One aspect of the invention is an inertial measurement unit. The inertial measurement unit may include a housing with an internal volume. The internal volume may have a dimension along an axis. A sensing element may be disposed in the internal volume. The sensing element may have a dimension along the axis that is less than the dimension of the internal volume.

At least one piezoelectric actuator may be disposed in the housing adjacent the sensing element. When the at least one piezoelectric actuator is activated, it may prevent movement of the sensing element along the axis. When the at least one piezoelectric actuator is not activated, it may not prevent movement of the sensing element along the axis.

Elastomeric material may be disposed between the sensing element and the housing to buffer movement of the sensing element along the axis.

The inertial measurement unit may include at least one fastener disposed between the housing and the sensing element. Elastomeric material may be disposed between a head of the fastener and the sensing element at one end of the fastener, and elastomeric material may be disposed between the housing and the sensing element at another end of the fastener.

Another aspect of the invention is a guided projectile with an inertial measurement unit therein.

A further aspect of the invention is a method that may include providing a projectile with an internal measurement unit. The method may include, prior to launching the projectile, activating at least one piezoelectric actuator in the internal measurement unit to prevent movement of a sensing element.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIGS. 1A and 1B are sectional and exploded views, respectively, of one embodiment of an IMU.

FIGS. 3A and 3B are sectional and exploded views, respectively, of an embodiment of an IMU having a piezoelectric actuator.

FIGS. 4A and 4B are enlarged views showing a piezoelectric actuator in the unpowered and powered states, respectively.

FIGS. 5A and 5B are sectional and exploded views, respectively, of an embodiment of an IMU having a series of piezoelectric actuators.

FIGS. 6A and 6B are sectional and exploded views, respectively, of an embodiment of an IMU having a tubular piezoelectric actuator.

FIGS. 7A and 7B are sectional and exploded views, respectively, of an embodiment of an IMU having a plurality of tubular piezoelectric actuators.

FIGS. 8A and 8B are sectional and exploded views, respectively, of an embodiment of an IMU having piezoelectric actuators and detents.

FIG. 9 is a schematic side view of a projectile having an IMU.

DETAILED DESCRIPTION OF THE PREFERRED EMBODIMENTS

Figure 2:
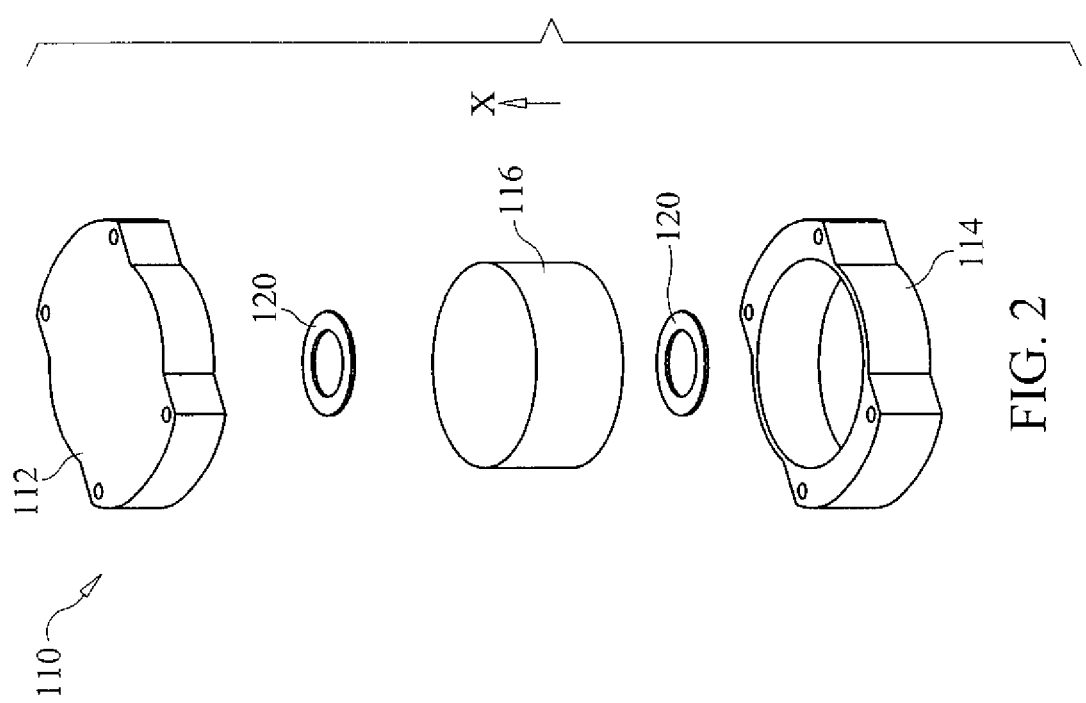
FIG. 2 is an exploded view of another embodiment of an IMU.

A method of improving the survivability of an IMU may include restraining a sensing element in the IMU during the launch phase of the projectile flight. Once the projectile is in free-flight, the sensing element may be released and allowed to float and function as intended. The method may include providing a means for restricting motion of the sensing element so that the sensing element will withstand the period of launching. After launching, the sensing element may be released. When released, the sensing element may float on, for example, elastomeric dampers. When released, the sensing element may perform its intended sensing function.

The invention may include a motion restricting device that applies force to the sensing element of an IMU of a guided projectile. The motion restricting device may include a piezoelectric actuator. The piezoelectric actuator may operate on the reverse piezoelectric effect. When an electric field is applied to the piezoelectric actuator, the actuator may undergo mechanical strain.

The piezoelectric actuator may apply a force to the sensing element of the IMU. The force applied by the piezoelectric actuator may force the sensing element to the end of its travel, may compress the sensing element temporarily, or may lock the sensing element in a position. During the time of actuation of the piezoelectric actuator, the guided projectile may be launched and the sensing element may be restrained. After the transient launch period, the piezoelectric actuator may be de-activated and the sensing element may be released. At this point, the IMU may be turned on and begin functioning as part of the flight control system for the guided projectile.

FIGS. 1A and 1B are sectional and exploded views, respectively, of an embodiment of an IMU 10. The IMU 10 may include a first housing portion 12 and a second housing portion 14. The first housing portion 12 may be attached to the second housing portion 14 by one or more of a variety of known means, such as adhesives, etc. Housing portions 12, 14 may define an internal volume V having a dimension d along the X-axis.

A sensing element 16 may be disposed within the internal volume V of the housing portions 12, 14. The sensing element 16 may have an X-axis dimension f that is less than the dimension d of the internal volume V. When operational, the sensing element 16 may have some freedom to move or float within the housing portions 12, 14 along the axis X, for example. The sensing element 16 may sense, for example, motion. Sensing element 16 may contain multiple sensors.

The sensing element 16 may be restrained in its movement by, for example, fasteners or bolts 18 and the first and second housing portions 12, 14. Elastomeric isolators 20 may be disposed between the bolts 18 and the sensing element 16. Bolts 18 may include heads 19. The elastomeric isolators 20 may provide shock absorption. The elastomeric isolators 20 may allow the sensing element 16 to translate axially, for example, in the X-direction, within the first and second housing portions 12, 14.

FIG. 2 is an exploded view of another embodiment of an IMU 110. The IMU 110 may include a first housing portion 112 and a second housing portion 114. The first housing portion 112 may be attached to the second housing portion 114 by one or more of a variety of known means, such as adhesives, etc. A sensing element 116 may be disposed within the housing portions 112, 114. When operational, the sensing element 116 may have some freedom to move or float within the housing portions 112, 114 along the axis X, for example. The sensing element 116 may sense, for example, motion. Sensing element 116 may contain multiple sensors.

Elastomeric isolators 120 may be disposed between the sensing element 116 and the respective housing portions 112, 114. The elastomeric isolators 120 may provide shock absorption. The elastomeric isolators 120 may allow the sensing element 116 to translate axially, for example, in the X-direction, within the first and second housing portions 112, 114. In FIG. 2, elastomeric isolators 120 are in the shape of annular rings; however, other shapes and configurations may be used.

FIGS. 3A and 3B are sectional and exploded views, respectively, of an embodiment of an IMU 30 having a piezoelectric actuator 34. A piezoelectric actuator disk 34 may be located in a recess 38 in housing 36. When not activated, the piezoelectric actuator disk 34 may not contact the sensing element 16. When powered (electric power source not shown) or activated, the piezoelectric actuator disk 34 may increase in length in the X direction, thereby compressing the sensing element 16.

FIGS. 4A and 4B are enlarged views showing the piezoelectric actuator disk 34 in the unpowered (de-activated) and activated states, respectively. Housing 114 in FIG. 2 may be modified with a recess similar to recess 38 in housing 36 and a piezoelectric actuator disk 34 placed therein, similar to FIGS. 3A and 3B.

A series of piezoelectric actuator disks 34 may be used in a stack to perform the compressing function. FIGS. 5A and 5B are sectional and exploded views, respectively, of an embodiment of an IMU 40 having a series of piezoelectric actuators 34. Piezoelectric disks 34 may be located in recesses 43 in housings 42 and 44. When activated with electrical power, the actuator disks 34 may clamp the sensing element 16 to the housings 42, 44. When de-activated, the disks 34 may return to their original state and the sensing element 16 may be free to move for the duration of free flight.

FIGS. 6A and 6B are sectional and exploded views, respectively, of an embodiment of an IMU 50 having a tubular piezoelectric actuator 52. Sensing element 16 may be, for example, substantially cylindrical. Actuator 52 may be fixed or mounted to the internal sides of housings 54, 56. When the tubular actuator 52 is activated, a dimension g of the actuator 52, measured perpendicular to the X axis may increase. Thus, the tubular actuator 52 may constrict and engage the external wall of the sensing element 16. In that way, the X axis translation of the sensing element 16 may be restricted.

Or, the tubular actuator 52 may be fixed to the sensing element 16. When the tubular actuator 52 is activated, a dimension h of the piezoelectric actuator 52, measured along the X axis may increase, thereby restricting X axis translation of the sensing element 16.

FIGS. 7A and 7B are sectional and exploded views, respectively, of an embodiment of an IMU 60 having tubular piezoelectric actuators 62. Actuators 62 may be disposed between the elastomeric isolators 20 located at opposite ends of the bolts 18. The shoulder bolts 18 pass through the tubular piezoelectric actuators 62 and function as guide rails. When activated, the tubular piezoelectric actuators 62 may increase in length in the X direction, thereby compressing the elastomeric isolators 20 and limiting the X axis translation of the sensing element 16 in housings 64, 66. Additionally, the tubular piezoelectric actuators 62 may also constrict, thus clamping onto the shoulder bolts 18 and further restricting the X axis translation of the sensing element 16.

FIGS. 8A and 8B are sectional and exploded views, respectively, of an embodiment of an IMU 70 having one or more piezoelectric actuators 72 and respective detents 74. Piezoelectric actuators 72 may be fixed to their respective detents 74. One or both of housings 76, 78 may include recesses 80 formed on internal surfaces. Piezoelectric actuators 72 and detents 74 may be disposed in recesses 80. Sensing element 16 may include one or more indentations 82 formed on its external surface adjacent detents 74.

Actuators 72 may translate detents 74 into and out of indentations 82. The detents 74 may lock the sensing element 16 to the housings 76, 78 when the piezoelectric actuators 72 are activated. When the power is removed and the piezoelectric actuators 72 are de-activated, the detents 74 may return to their original locations, out of the indentations 82, and unlock the sensing element 16.

An exemplary material for the housings of the IMU and portions of the sensing element 16 may be polyetheretherketone (PEEK). Other materials may be used, such as other suitable polymers or composite materials that are dimensionally and structurally stable at temperature extremes, such as −60 degrees F. to 200 degrees F. A composite material may be a combination of PEEK and glass fiber that may be injection molded into the required structural shape.

FIG. 9 is a schematic side view of a projectile 90 having an IMU, such as, for example, IMU 30, 40, 50, 60, or 70.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An inertial measurement unit, comprising:
   a housing including an internal volume, the internal volume having a dimension along an axis;
   a sensing element disposed in the internal volume, the sensing element having a dimension along the axis that is less than the dimension of the internal volume; and
   at least one piezoelectric actuator disposed in the housing adjacent the sensing element, wherein, when the at least one piezoelectric actuator is activated, the at least one piezoelectric actuator prevents movement of the sensing element along the axis, and wherein, when the at least one piezoelectric actuator is not activated, the at least one piezoelectric actuator does not prevent movement of the sensing element along the axis, further comprising elastomeric material disposed between the sensing element and the housing to buffer movement of the sensing element along the axis.

2. The unit of claim 1, wherein the at least one piezoelectric actuator comprises first and second piezoelectric actuators disposed on opposite sides of the sensing element wherein, when the first and second piezoelectric actuators are activated, the first and second piezoelectric actuators prevent movement of the sensing element along the axis, and wherein, when the first and second piezoelectric actuators are not activated, the first and second piezoelectric actuators do not prevent movement of the sensing element along the axis.

3. A guided projectile comprising the unit of claim 1.

4. A method, comprising:
   providing a projectile with the internal measurement unit of claim 1; and
   prior to launching the projectile, activating the at least one piezoelectric actuator to prevent movement of the sensing element along the axis.

5. The method of claim 4, further comprising, after activating the at least one piezoelectric actuator, launching the projectile.

6. The method of claim 5, further comprising, after launching the projectile, de-activating the at least one piezoelectric actuator.

7. An inertial measurement unit, comprising:
   a housing including an internal volume, the internal volume having a dimension along an axis;
   a sensing element disposed in the internal volume, the sensing element having a dimension along the axis that is less than the dimension of the internal volume; and
   at least one piezoelectric actuator disposed in the housing adjacent the sensing element, wherein, when the at least one piezoelectric actuator is activated, the at least one piezoelectric actuator prevents movement of the sensing element along the axis, and wherein, when the at least one piezoelectric actuator is not activated, the at least one piezoelectric actuator does not prevent movement of the sensing element along the axis, further comprising at least one fastener disposed between the housing and the sensing element, elastomeric material disposed between a head of the fastener and the sensing element at one end of the fastener, and elastomeric material disposed between the housing and the sensing element at another end of the fastener.

8. The unit of claim 7, wherein the at least one piezoelectric actuator is disposed in a recess in the housing such that, when the at least one piezoelectric actuator is not activated, the at least one piezoelectric actuator does not contact the sensing element, and when the at least one piezoelectric actuator is activated, the at least one piezoelectric actuator contacts the sensing element.

9. The unit of claim 8, wherein the sensing element comprises polyetheretherketone and glass fiber.

10. The unit of claim 7, wherein the at least one piezoelectric actuator is tubular and is disposed between 1) the elastomeric material disposed between the head of the fastener and the sensing element at the one end of the fastener, and 2) the elastomeric material disposed between the housing and the sensing element at the other end of the fastener.

11. An inertial measurement unit, comprising:
    a housing including an internal volume, the internal volume having a dimension along an axis;
    a sensing element disposed in the internal volume, the sensing element having a dimension along the axis that is less than the dimension of the internal volume; and
    at least one piezoelectric actuator disposed in the housing adjacent the sensing element, wherein, when the at least one piezoelectric actuator is activated, the at least one piezoelectric actuator prevents movement of the sensing element along the axis, and wherein, when the at least one piezoelectric actuator is not activated, the at least one piezoelectric actuator does not prevent movement of the sensing element along the axis, wherein the sensing element is substantially cylindrical and the at least one piezoelectric actuator is tubular.

12. The unit of claim 11, wherein, when the at least one piezoelectric actuator is actuated, a dimension of the at least one piezoelectric actuator measured along the axis increases.

13. The unit of claim 12, wherein the at least one piezoelectric actuator is fixed to the sensing element.

14. The unit of claim 11, wherein, when the at least one piezoelectric actuator is actuated, a dimension of the at least one piezoelectric actuator measured perpendicular to the axis increases.

15. The unit of claim 14, wherein the at least one piezoelectric actuator is fixed to the housing.

16. An inertial measurement unit, comprising:
    a housing including an internal volume, the internal volume having a dimension along an axis;
    a sensing element disposed in the internal volume, the sensing element having a dimension along the axis that is less than the dimension of the internal volume; and
    at least one piezoelectric actuator disposed in the housing adjacent the sensing element, wherein, when the at least one piezoelectric actuator is activated, the at least one piezoelectric actuator prevents movement of the sensing element along the axis, and wherein, when the at least one piezoelectric actuator is not activated, the at least one piezoelectric actuator does not prevent movement of the sensing element along the axis, further comprising at least one indentation formed in a wall of the sensing element, and a detent fixed to the at least one piezoelectric actuator and disposed in an internal wall of the housing adjacent the at least one indentation, wherein, when the at least one piezoelectric actuator is activated, the detent is moved into the at least one indentation to prevent movement of the sensing element along the axis, and wherein, when the at least one piezoelectric actuator is not activated, the detent is removed from the at least one indentation to allow movement of the sensing element along the axis.

17. An inertial measurement unit, comprising:
    a housing including an internal volume, the internal volume having a dimension along an axis;
    a sensing element disposed in the internal volume, the sensing element having a dimension along the axis that is less than the dimension of the internal volume; and at least one piezoelectric actuator disposed in the housing adjacent the sensing element, wherein, when the at least one piezoelectric actuator is activated, the at least one piezoelectric actuator prevents movement of the sensing element along the axis, and wherein, when the at least one piezoelectric actuator is not activated, the at least one piezoelectric actuator does not prevent movement of the sensing element along the axis, wherein the housing comprises polyetheretherketone.

18. The unit of claim 17, wherein the housing comprises polyetheretherketone and glass fiber.

19. An inertial measurement unit, comprising:
a housing including an internal volume, the internal volume having a dimension along an axis;
a sensing element disposed in the internal volume, the sensing element having a dimension along the axis that is less than the dimension of the internal volume; and
at least one piezoelectric actuator disposed in the housing adjacent the sensing element, wherein, when the at least one piezoelectric actuator is activated, the at least one piezoelectric actuator prevents movement of the sensing element along the axis, and wherein, when the at least one piezoelectric actuator is not activated, the at least one piezoelectric actuator does not prevent movement of the sensing element along the axis, wherein the sensing element comprises polyetheretherketone.

* * * * *